US008615055B2

(12) United States Patent
Milotta et al.

(10) Patent No.: US 8,615,055 B2
(45) Date of Patent: Dec. 24, 2013

(54) COMMUNICATION BETWEEN MODEMS IN XPIC CONFIGURATION FOR WIRELESS APPLICATIONS (75) Inventors: Giovanni Milotta, Busto Arsizio (IT); Antonio Carugati, Lissone (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 65 days.

(21) Appl. No.: 13/260,606

(22) PCT Filed: Mar. 30, 2009

(86) PCT No.: PCT/EP2009/053754
§ 371 (c)(1),
(2), (4) Date: Sep. 27, 2011

(87) PCT Pub. No.: WO2010/112061
PCT Pub. Date: Oct. 7, 2010

(65) Prior Publication Data
US 2012/0039372 A1    Feb. 16, 2012

(51) Int. Cl.
*H04L 27/02* (2006.01)
(52) U.S. Cl.
USPC .................... 375/324; 375/364; 375/220
(58) Field of Classification Search
USPC .................... 375/324, 364, 220
See application file for complete search history.

(56) References Cited

U.S. PATENT DOCUMENTS

| 5,075,697 A * | 12/1991 | Koizumi et al. ............. 342/361 |
| 5,383,224 A * | 1/1995 | Mizoguchi ................... 375/346 |
| 5,406,589 A * | 4/1995 | Iwamatsu et al. ............ 375/349 |
| 5,844,950 A * | 12/1998 | Aono et al. .................. 375/346 |
| 5,905,574 A * | 5/1999 | Vollbrecht et al. ........... 356/491 |
| 6,236,263 B1 * | 5/2001 | Iwamatsu .................... 329/306 |
| 6,295,323 B1 * | 9/2001 | Gabara ........................ 375/257 |
| 6,366,609 B1 * | 4/2002 | Rossi ........................... 375/222 |
| 6,650,289 B2 * | 11/2003 | Levy et al. ................... 342/367 |
| 6,731,704 B1 * | 5/2004 | Kiyanagi ..................... 375/346 |
| 6,782,211 B1 * | 8/2004 | Core ............................ 398/205 |
| 7,016,438 B2 * | 3/2006 | Kurokami .................... 375/346 |
| 7,509,141 B1 | 3/2009 | Koenck et al. |
| 8,014,686 B2 * | 9/2011 | Rahn et al. .................. 398/205 |
| 8,095,088 B2 * | 1/2012 | Shen et al. ................ 455/114.3 |
| 8,165,008 B2 * | 4/2012 | Ridel et al. ................... 370/204 |

(Continued)

OTHER PUBLICATIONS

Lankl, B. et al., "Fully Digital ATDE's and XPIC's for a STM-1 Cochannel Radio System Family", Jun. 11, 1989, pp. 1013-1019, XP010081214.

(Continued)

*Primary Examiner* — Daniel Washburn
*Assistant Examiner* — Berhanu Tadese
(74) *Attorney, Agent, or Firm* — Rothwell, Figg, Ernst & Manbeck, P.C.

(57) ABSTRACT

A radio communication network which comprises a plurality of radio links for communicating radio signals with orthogonal polarization. Each radio link comprises a vertical polarization communication device (11a) and a horizontal polarization communication device (11b) which share a local communication channel (11c). Each of these communication devices comprises at least one differential interface stage (21a, 21b, 31a, 31b) for communicating first data over the local communication channel (11c), based on a differential input. Each of these vertical and horizontal communication devices (11a, 11b) comprises means (27, 37) connected to the differential interface stages for communicating second data over the local communication channel by modulating a common mode of the differential interface stages.

24 Claims, 8 Drawing Sheets

(56) References Cited

U.S. PATENT DOCUMENTS

| | | | |
|---|---|---|---|
| 8,275,071 B2* | 9/2012 | Shen et al. | 375/316 |
| 2002/0061752 A1* | 5/2002 | Kurokami | 455/447 |
| 2003/0162522 A1* | 8/2003 | Valtolina et al. | 455/314 |
| 2004/0132414 A1* | 7/2004 | Sendyk et al. | 455/73 |
| 2007/0116162 A1* | 5/2007 | Eliaz et al. | 375/350 |
| 2008/0063129 A1 | 3/2008 | Voutilainen | |
| 2008/0285684 A1* | 11/2008 | Shen et al. | 375/324 |
| 2008/0287076 A1* | 11/2008 | Shen et al. | 455/114.3 |
| 2009/0086862 A1* | 4/2009 | Thesling et al. | 375/346 |
| 2009/0238579 A1* | 9/2009 | Rahn et al. | 398/152 |
| 2009/0268792 A1* | 10/2009 | Colombo | 375/219 |
| 2010/0185918 A1* | 7/2010 | Ashkenazi et al. | 714/752 |
| 2011/0274218 A1* | 11/2011 | Yakuwa | 375/340 |

OTHER PUBLICATIONS

Marconi, "MDRS155E—Operation—Module 1—Introduction", Jul. 31, 2008, Retrieved from the Internet: URL:http://m2vtelecom.files.wordpress.com/2008/07/microwave-basics.pdf>, 30 pages, XP002573781.

* cited by examiner

COMMUNICATION BETWEEN MODEMS IN XPIC CONFIGURATION FOR WIRELESS APPLICATIONS

CROSS-REFERENCE TO RELATED APPLICATION

This application is a 35 U.S.C. §371 National Phase Entry Application from PCT/EP2009/053754, filed Mar. 30, 2009, and designating the United States.

TECHNICAL FIELD

The present invention relates to wireless applications, in particular to systems and methods for locally transferring information between devices of a radio communication network in which, within every radio link, two orthogonally polarized signals are transmitted at the same time.

BACKGROUND

Today, more than ever, network operators are looking for solutions that will cover the most modern telecommunications trends, in term of efficiencies and traffic capability. In wireless networks an efficient solution in terms of capacity per Hertz of bandwidth used is to transmit two RF signals with Co-Channel Dual Polarized electro-magnetic field, with the same antenna (usually called H- and V-signals). Co-Channel Dual Polarization (CCDP) doubles the capacity of a wireless transmission network with a clear advantage to the network operator at the dense frequency bands, both in terms of capacity and in terms of frequency re-use.

Microwave radio energy travels in waves, transmitting in both horizontal and vertical directions. This physical phenomenon enables the transmission of RF waves on both polarizations at the same time. Co-channel dual-polarization operation provides two parallel communication channels over the same link with orthogonal polarizations, thus doubling the link capacity. Separate and independent signals are transmitted over the same wireless channel using a single cross polar antenna.

Despite the orthogonality of the two signals, some interference between the signals almost inevitably occurs, due to imperfect antenna isolation and channel degradation (typically rain depolarization effects).

The main technique to use the CCDP channels, and cancel the effects of the interference is called Cross polarization Interference Cancellation (XPIC).

Figure 1:
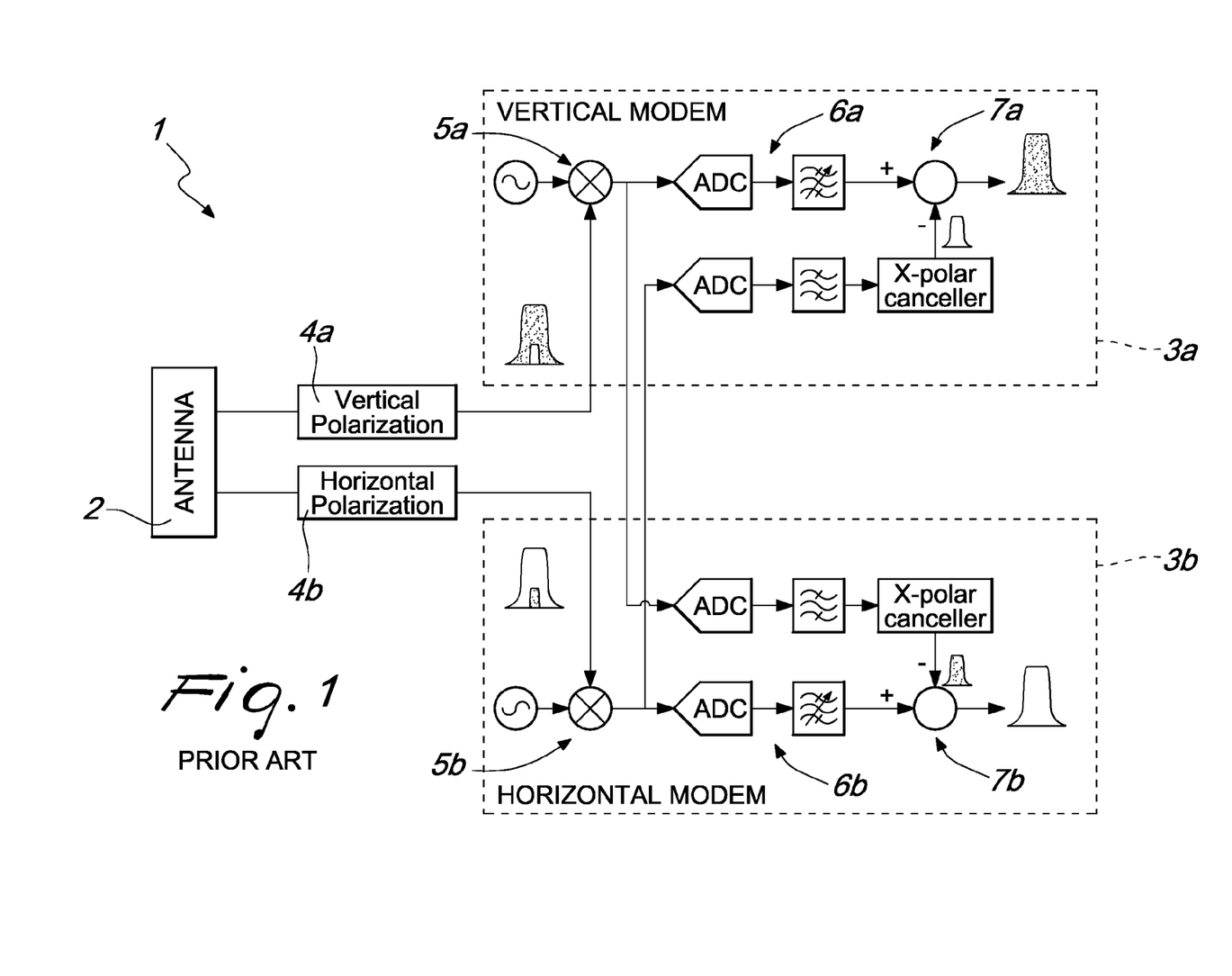
FIG. 1 is a high-level block diagram of a typical XPIC receiver according to the prior art.

FIG. 1 shows the high-level block diagram of the receiver side of a known XPIC system.

The system 1 comprises a cross-polarization antenna 2 which receives two orthogonally polarized radio signals, a vertically polarized signal 4a and a horizontally polarized signal 4b, which are both QAM modulated.

A vertical modem 3a and a horizontal modem 3b are provided for respectively receiving the vertically polarized signal 4a and the horizontally polarized signal 4b detected by antenna 2. In particular, the modems contain demodulators 5a and 5b for performing demodulation of a base-band signal and the demodulated base-band signals so obtained are exchanged between the two modems, so as to carry out the cross-polar cancellation. Specifically, after an Analog-to-Digital conversion and band-pass filtering 6a and 6b of both the polar and the cross-polar signals in both modems, the subtraction of the cross-polar signal from the polar signal is performed in nodes 7a and 7b, thus canceling the cross-polar interference. The cross-polar canceller of each modem processes and combines the signals from the two receiving paths to recover the original, independent signals.

A modern trend with existing technology is to use wireless system with Adaptive Modulation functionality. The use of Adaptive Modulation offers an increased capacity over the same radio frequency channel, during periods with favorable propagation conditions. This is obtained using modulation schemes higher than those used to dimension the link for a guarantee capacity and related to a licensed spectrum efficiency class. This results in a higher capacity even with a lower availability due to reduced link budget (according the higher Bit Error Rate threshold and reducing transmission power to improve linearity).

Nowadays the technology challenge is to develop microwave radio links that are able to simultaneously support both functionalities, Adaptive Modulation and XPIC, to assure more and more traffic capability and a higher optimization of the radio link performances.

Problems with the existing solutions are related to the fact that the XPIC system previously described, albeit very efficient, is not fully optimized for Adaptive Modulation function and for new dynamic services.

In fact, using the XPIC solution above, with a fixed modulation radio link, no intercommunication channels between the two modems (managing horizontal and vertical polarization) are needed. The Digital Signal Processing block in the modem, which performs the cross polarized cancellation, works independently from the status of the modem which is processing the cross polarization.

On the contrary, if XPIC were combined with Adaptive Modulation or with these new kind of dynamic services, some communication between the two modems would be required, for sharing between them additional information such as modulation order, traffic rate, and any other available information that must be useful for Adaptive Modulation purposes.

The main disadvantage of the present solutions is hence the absence of a native communication channel between the two modems, unless to install extra wires or cables between the equipment, leading to extra production costs and greater complexity in term of installation.

SUMMARY

Aim of the present invention is to overcome the above drawbacks affecting the prior art.

This aim and other objects which will become better apparent hereinafter are achieved by a communication device that comprises at least one differential interface stage, with the function of communicating first data over a communication channel, based on a differential input. The main characteristic of the communication device is that it comprises means connected to the differential interface stage for communicating second data over the communication channel by modulating a common mode of the differential interface stage.

Preferably, the differential interface stage comprises a first and a second differential interface stage, in order to transmit reciprocally orthogonal components of the first data over the communication channel.

Moreover, the differential interface stage comprises a third and a fourth differential interface stage, in order to receive reciprocally orthogonal components of the first data from the communication channel. The differential interface stage may further comprise at least one first buffer.

The means for communicating the second data and connected to the differential interface stage may comprise a second buffer.

The communication device may comprise at least one Quadrature Amplitude Modulation (QAM) demodulator connected to the differential input, and at least one Cross-Polarization Interference Canceller (XPIC) which is connected to an output of the third and fourth differential interface stages.

The second data may be a digital data which is encoded through a Manchester code or a 33/66% Pulse Width Modulation code, and may be communicated in a structured frame of a fixed length.

The communication device may be a modem suitable for adaptive modulation and cross-polarization cancellation radio links.

The above aim and objects are also achieved by a radio link which communicates radio signals with orthogonal polarization and which comprises a vertical polarization communication device and a horizontal polarization communication device which share a local communication channel.

Each of these communication devices comprises at least one differential interface stage, for communicating first data over the local communication channel, based on a differential input. The main characteristic is that each of these vertical- and horizontal-polarization communication devices comprises means connected to the differential interface stage for communicating second data over the local communication channel by modulating a common mode of the differential interface stage.

The differential interface stage may comprise a first and a second differential interface stage, for transmitting reciprocally orthogonal components of the first data over the communication channel. The differential interface stage may furthermore comprise a third and a fourth differential interface stage, for receiving reciprocally orthogonal components of the first data from the communication channel.

Moreover, the least one differential interface stage may comprise at least one first buffer.

The means for communicating the second data and connected to the differential interface stage may comprise a second buffer.

Each of the vertical- and horizontal-polarization communication devices may comprise at least one Quadrature Amplitude Modulation (QAM) demodulator, which is connected to the differential input. At least one Cross-Polarization Interference Canceller (XPIC) may be connected to an output of the third and fourth differential interface stages.

The second data may preferably be a digital data which is encoded through a Manchester code or a 33/66% Pulse Width Modulation code and communicated in a structured frame of a fixed length.

The radio link may be an adaptive modulation and cross-polarization cancellation radio link.

According to a further aspect of the invention, a radio communication network is provided which comprises a plurality of radio links for communicating radio signals with orthogonal polarization. Each radio link comprises a vertical polarization communication device and a horizontal polarization communication device which share a local communication channel; each of these communication devices comprises at least one differential interface stage for communicating first data over the local communication channel based on a differential input. The main characteristic is that each of these vertical and horizontal polarization communication devices comprises means, connected to the differential interface stage, which communicate second data over the local communication channel by modulating a common mode of the differential interface stage.

The differential interface stage may comprise a first and a second differential interface stage, for transmitting reciprocally orthogonal components of the first data over the communication channel.

The differential interface stage may also comprise a third and a fourth differential interface stage, for receiving reciprocally orthogonal components of the first data from the communication channel.

Moreover, the differential interface stage may comprise at least one first buffer.

The means for communicating the second data and connected to the differential interface stage may comprise a second buffer.

Each of the vertical- and horizontal-polarization communication devices may further comprise at least one Quadrature Amplitude Modulation (QAM) demodulator, which is connected to the differential input. At least one Cross-Polarization Interference Canceller (XPIC) may be connected to an output of the third and fourth differential interface stages.

The second data may preferably be a digital data, encoded through a Manchester code or a 33/66% Pulse Width Modulation code and communicated in a structured frame of a fixed length.

Each of the vertical- and horizontal-polarization communication devices may be a modem suitable for adaptive modulation and cross-polarization cancellation radio links.

The aim and objects of the invention are also achieved by a method for communication of radio signals in a radio communication network between a plurality of radio links. Each radio link includes a vertical polarization communication device and a horizontal polarization communication device; the vertical polarization communication device receives a vertically polarized radio signal, the horizontal polarization communication device receives a horizontally polarized radio signal.

At each radio link, a local communication channel shared between the vertical polarization communication device and the horizontal polarization communication device is provided.

The first data is communicated over the local communication channel by each one of these horizontal and vertical polarization communication devices, through a respective differential interface stage based on a differential input.

The method is characterized, at anyone of the vertical polarization communication device and the horizontal polarization communication device, by the step of communicating second data over the local communication channel by modulating a common mode of the differential interface stage.

The above step of providing a local communication channel may preferably comprise embedding a digital communication channel between the vertical polarization communication device and the horizontal polarization communication device.

Besides, the step of communicating first data may comprise the step of demodulating a received radio signal into two reciprocally orthogonal components, sending a respective one of these orthogonal components to the differential input of the differential interface stages and transmitting the orthogonal components of the first data over the local communication channel.

The step of communicating first data may also comprise, at the differential input, the step of receiving reciprocally orthogonal components of the first data from the local communication channel and the step of transmitting these reciprocally orthogonal components to a Cross Polarization Interface Canceller so as to obtain a cross-talk compensation signal.

The method further includes the steps of, at the vertical polarization communication device, subtracting from the demodulated received radio signal the cross-talk compensation signal from the horizontal communication device and, at the horizontal polarization communication device, subtracting from the demodulated received radio signal the cross-talk compensation signal from the vertical communication device.

The step of communicating second data may comprise, at each one of the vertical and horizontal polarization communication devices, the step of encoding a digital data stream containing information to be shared by the vertical polarization communication device and the horizontal polarization communication device. It may also comprise the step of sending the encoded digital data stream to a common mode node of the differential interface stages, so as to be transmitted over the local communication channel.

The step of communicating second data may comprise, at each one of the vertical and horizontal polarization communication devices, the step of receiving the second data at a common mode node of the differential interface stage. The second data may contain information to be shared by the vertical polarization communication device and the horizontal polarization communication device. Moreover, the step of communicating second data may comprise the step of decoding the second data into a digital data stream.

The method may further include the step of encoding according to a Manchester code or to a 33/66% Pulse Width Modulation code.

The method may include the step of communicating second data in a structured frame of a fixed length.

It is seen that the invention advantageously supplies an embedded digital data channel between the two modems operating in XPIC configuration, offering an extra digital intercommunication channel. The embedded channel supplies an extra communication path in order to share information between the two modems, necessary for instance when Adaptive Modulation features must or shall be supported. In fact, when both XPIC and adaptive modulation features are required, it is fundamental to provide a proper way to exchange information in run-time between the two modems, such as modulation order and traffic rate.

The communication channel, running at a bit rate approximately up to 1 Mbps, can also be used to share information such as status of the link, monitoring, alarms etc. This smart solution could also be employed to optimize the radio link performance by handshaking over the hop information about the status of a polarization channel using its orthogonal one, for instance when a fault or high fading level occurs to just one polarization path.

A further benefit of the embedded channel, herein described, is the possibility to remove all XPIC cable detection circuitry (circuits able to provide the alarms about the right connection of the XPIC cable). This circuitry can be substituted with an all-digital solution, as "data toggling detection" or "frame alignment alarm" (detectors based of itself operability on the digital channel between the two XPIC modems). This gives obvious advantages in terms of cost reduction, reliability and Mean Time Between Failures of the board.

The invention supplies a novel, easy and cheap solution to perform this digital service channel between the two modems. In fact, no extra physical connection (cable or wires) is provided between the two equipment boards to perform XPIC and adaptive modulation functionalities simultaneously. This technique takes advantage of the essential existing connections needed to perform the XPIC functionality. In this way, easy-to-install and cheaper radio links can be offered. In fact, no extra cables allow to supply clean solution equipment and, consequently, systems will be more efficient and reliable.

Moreover, the invention offers extremely more flexible microwave link solutions that provide intra-modems communications via backplane or which require the mounting of an extra receiver on the same board to accomplish XPIC function. In fact, besides simplifying the design of the backpanels, thus reducing the production costs and raising the system Mean Time Between Failures, it also gives users the possibility to install the modem units not necessarily only in fixed slot positions (typically adjacent to each other). This is important especially when gradual features system upgrades are foreseen. This solution allows the upgrade of an XPIC radio link system, installed in a properly shelf magazine, adding also the adaptive modulation functionality without requiring modifications to the arrangements of the modems in the shelf. Indeed, the simultaneous presence of XPIC and adaptive modulation features, adopting the invention, is completely independent from the slot positions where the modems are to be installed.

Advantageously, if two XPIC modems are arranged in two different shelf magazines, customers would be able to install the components sequentially, without changing the hardware. For instance, adaptive modulation could be installed subsequent to the XPIC without the need for any modem modifications or board rearrangements in the shelf magazine.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 2:
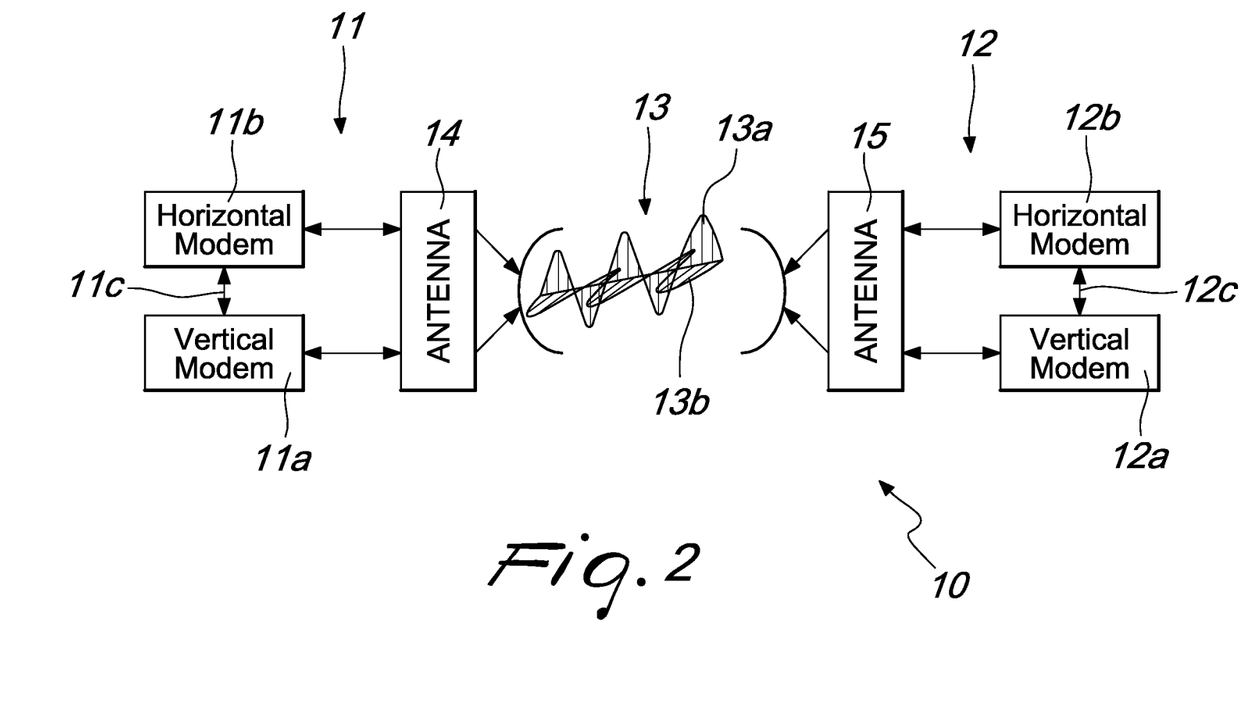
FIG. 2 is a block diagram of a radio communication network according to the invention.

FIG. 2 shows a radio communication network 10 which comprises a plurality of radio links for communicating radio signals with orthogonal polarization, such as RF signals with CCDP electromagnetic field.

For the sake of simplicity it is shown only one couple of these radio links, and in particular a first radio link 11 and a second radio link 12. The first radio link 11 acts as a receiver stage and comprises a vertical polarization communication device 11a and a horizontal polarization communication device 11b, and similarly the second radio link 12 acts as a transmitter stage and comprises a vertical polarization communication device 12a and a horizontal polarization communication device 12b. Advantageously, the vertical- and horizontal-polarization communication devices are modems and will be referred to as such in the following description.

The horizontal and vertical modems for each radio link share a local communication channel, indicated as 11c for the first radio link 11 and as 12c for the second radio link 12.

The first radio link 11 is provided with a first cross-polar antenna 14, as well as the second radio link 12 is provided with a second cross-polar antenna 15.

The first cross-polar antenna 15 is suitable to transmit a radio signal 13 with two orthogonally polarized components 13a and 13b, which can be received by the second cross-polar antenna 14.

Figure 3:
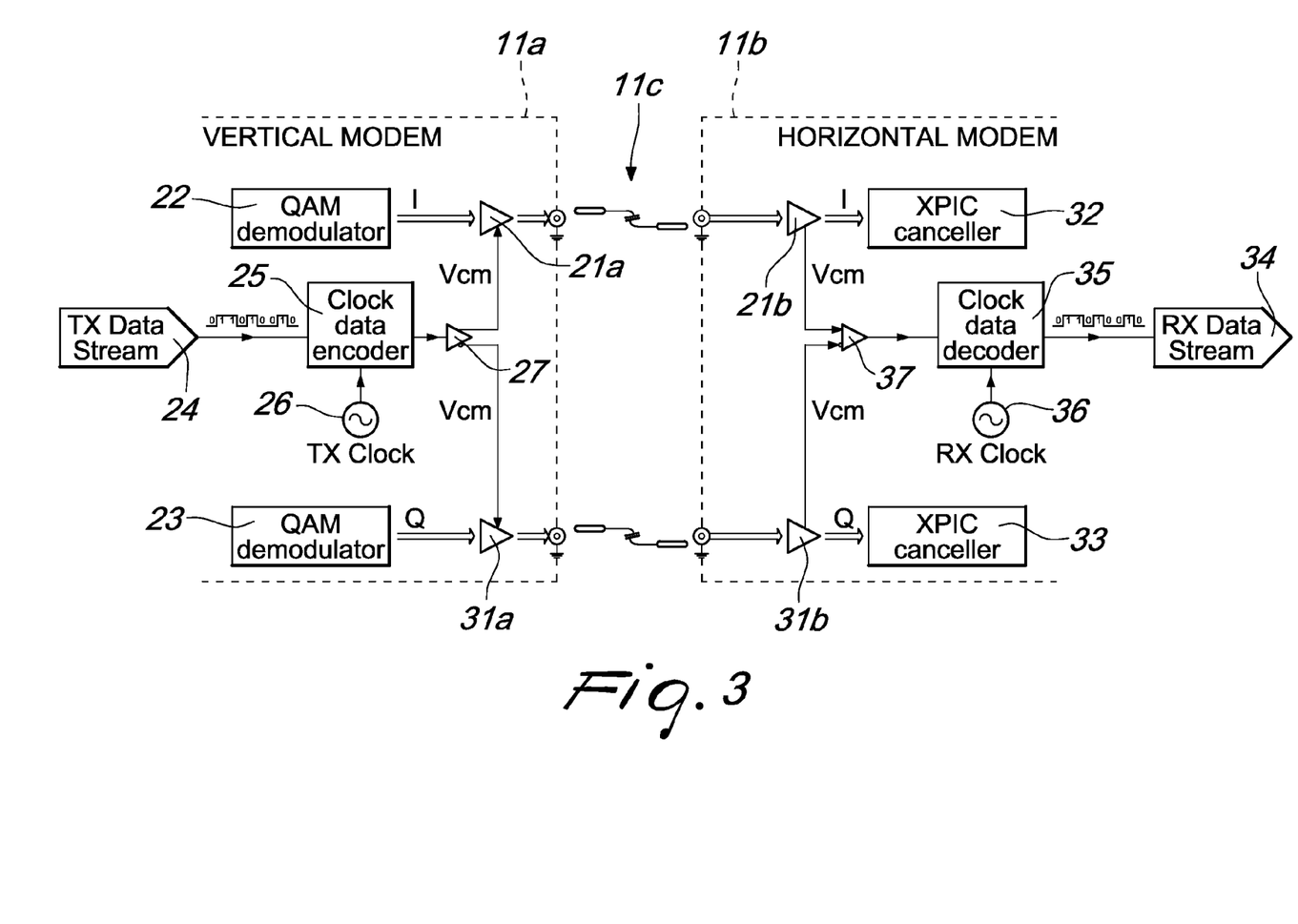
FIG. 3 is a high-level block diagram of a receiver stage according to the invention.

FIG. 3 shows in more detail the general arrangement for providing a local communication channel 11c from vertical modem 11a to horizontal modem 11b.

The vertical modem 11a is adapted to transmit first data over the local communication channel 11c, which can be obtained by connecting a cable between interface stages of both modems. In particular, the vertical modem 11a comprises at least one demodulator, for demodulating the vertically polarized radio signal 13a received from the first cross-polarized antenna 14 and obtaining the first data to be transmitted over the local communication channel 16.

In the preferred embodiment of the invention, two QAM demodulators 22 and 23 are provided in the vertical modem 11a, so as to demodulate respective quadrature components (indicated with I and Q signal) of the vertically polarized radio signal 13a received by the first cross-polar antenna 14.

Downstream of the QAM demodulators 22 and 23 transmitting differential interface stages are connected. A first differential interface stage 21a operates on the I-component output by the first QAM demodulator 22, while a second differential interface stage 31a operates on the Q-component output by the second QAM demodulator 23.

The vertical modem 11a also comprises a TX data stream source 24 for generating uncoded second data to be transmitted in a channel embedded into the local communication channel 11c. The uncoded second data may be a digital data stream, which may be suitably encoded before transmission over the embedded communication channel. To this aim, the vertical modem 11a may comprise a clock data encoder 25 connected downstream of the TX data stream source 24 and provided with a TX clock generator 26. Possible encoding methods will be described hereinafter.

The output of the clock data encoder 25 represents the second data which, through proper means 27, such as a buffer, is fed to the first differential interface stage 21a as a common mode signal. Because of the QAM demodulation, the second data is also fed to the second differential stage 31a. The second data accordingly modulates the common mode of the differential stages which would be otherwise at zero or constant potential with respect to ground.

It is seen that, by adding an embedded communication channel into the existing local communication channel 11c as previously described, no further cables or interconnections between the two modems are needed.

In the horizontal modem 11b means are provided for receiving the first data and the second data transmitted by the vertical modem 11a over the communication channel 11c. More in detail, two receiving differential interface stages 21b and 31b respectively receive the I- and Q-component of the demodulated data from the vertical modem 11a.

The horizontal modem 11b also comprises means 37, such as a buffer, connected to the receiving differential interface stages 21b and 31b for extracting a common mode component from both receiving differential interface stages 21b and 31b. Since the common mode signal is transmitted by the vertical modem 11a as two quadrature digital signals I and Q, the common mode signal Vcm extracted by means 37 from the differential stage 31b is denied.

A clock data decoder 35, which can be provided with its own RX clock 36, is connected downstream of the buffer 37 and is able to recover the uncoded second data and feed it to a data stream receiver 34, which will then make use of such second data, for instance for adaptive modulation purposes.

Apart from the extraction of a common mode component, the output of the differential interface stages 21b and 31b is connected to respective XPIC cancellers 32 and 33, which process the two orthogonal signals for XPIC cancellation purposes, according to the prior art.

Figure 4:
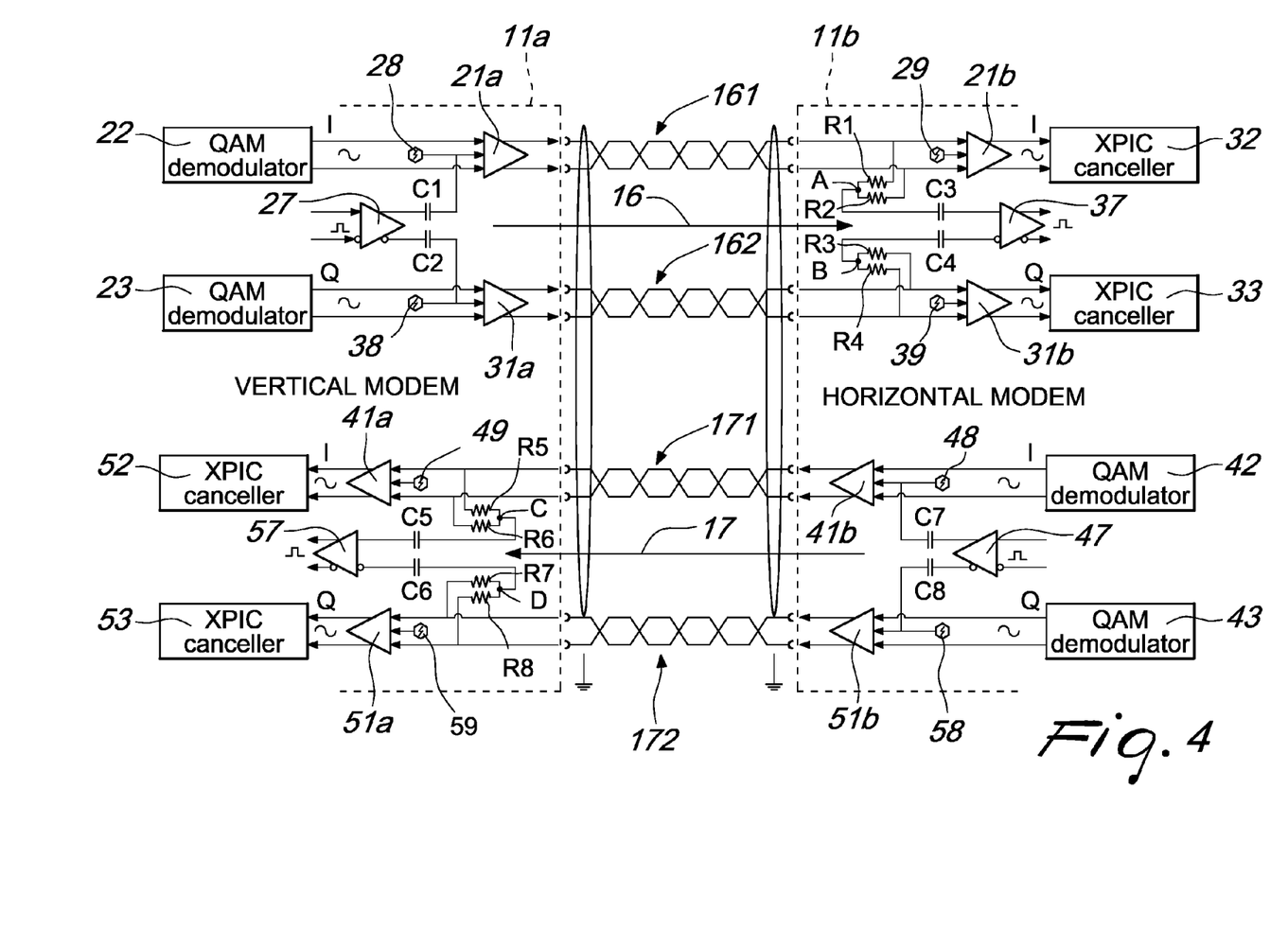
FIG. 4 is a receiver stage according to a preferred embodiment of the invention.

FIG. 4 gives a more detailed view of the components of the vertical and the horizontal modems 11a and 11b, which includes both flows of information on the local communication channel 11c. In particular, a first communication channel 16 carries the information from the vertical modem 11a to the horizontal modem 11b, while a second communication channel 17 carries the information from the horizontal modem 11b to the vertical modem 11a.

The first communication channel 16 comprises respective differential interconnections 161 and 162 for the I- and Q-components of the demodulated signal carrying the first data and for the common mode signals carrying the second data. Similarly, the second communication channel 17 comprises respective differential interconnections 171 and 172 through which first data and second data from the horizontal modem to the vertical modem are transmitted, as it will be described hereinafter.

In the vertical modem 11a, as described above, the first QAM demodulator 22 is provided for demodulating an I-component of the vertically polarized radio signal 13a received by antenna 14, e.g. by multiplying it with a sine signal, while the second QAM demodulator 23 demodulates a Q-component of the same vertically polarized signal 13a, by multiplying such signal with a quadrature signal (e.g. a cosine signal).

The differential interface stages 21a and 31a are preferably operational amplifiers for differential signal processing, in a buffer configuration, which allow to set the common-mode output voltage by biasing a properly own pin (respectively indicated with 28 and 38) and swinging it within a medium frequency bandwidth.

A differential digital driver 27 with low output voltage swing is employed as the means for communicating the second data and is particularly adapted to drive the embedded communication channel. Preferably, a common and cheap Low-Voltage Differential Signaling (LVDS) buffer could be used for this purpose. Such driver 27 has the inputs connected to the output of the clock data encoder 25 of FIG. 3, although this is not shown in FIG. 4.

The two differential outputs of the buffer 27 are respectively AC coupled via capacitors C1 and C2 to the common mode nodes 28 and 38 of the analog differential interface stages 21a and 31a. The capacity of the de-coupling capacitors C1 and C2 is chosen based on the maximum frequency required for the embedded communication channel.

The receiving differential interface stages 21b and 31b of the horizontal modem 11b may be operational amplifiers for differential signal processing, in a buffer configuration, so as to buffer the I- and Q-demodulated base-band signals.

In order to extract the common mode signal from the I- and Q-signals received by the horizontal modem 11*b*, serial resistors R1-R2 and R3-R4 with equal resistance value supply a proper termination of the two differential lines fed to the differential inputs of stages 21*b* and 31*b*.

In particular, the serial resistors R1-R2 and R3-R4 comprise respective middle points A and B which are connected to the differential inputs of a buffer 37 adapted to probe the voltage of such middle points. The connection occurs via respective capacitors C3 and C4, so that the voltage changes can be detected. In this way, the common mode voltage applied to the transmitter side via buffer 27 is also received at the middle points A and B of the two serial resistor networks R1-R2 and R3-R4.

The buffer 37 is a differential low swing voltage buffer, used to receive the differential value between the two common mode voltages at points A and B. Thus, the voltage difference between the inputs of buffer 37, which is output by the buffer 37 itself, is exactly the same recovered digital data stream supplied on the transmitter side in the vertical modem 11*a*, at the input of 27. With the clock data decoder 35 connected to the output of buffer 37, it is possible to decode such data and recover the original uncoded second data.

The above description referred to the first communication channel 16 from vertical modem 11*a* to horizontal modem 11*b*, where a transmitter side of the vertical modem 11*a* and the receiver side of the horizontal modem 11*b* are involved. However, a second, reverse communication channel 17 also exists for carrying out the XPIC cancellation at the vertical modem. To this aim, devices identically corresponding to those described above with reference to channel 16 are provided, although working in the opposite direction (from horizontal modem 11*b* to vertical modem 11*a*). A receiver side is provided in the vertical modem 11*a*, while a transmitter side is provided in the horizontal modem 11*b*. In this way a bi-directional digital data link is obtained.

The horizontal modem 11*b* communicates first data corresponding to the information carried by horizontally polarized radio signal 13*b* over the communication channel 17, and in order to do so it comprises two demodulators, which may be QAM demodulators 42 and 43 according to a preferred embodiment of the invention. The outputs of these QAM demodulators are fed to respective differential inputs of first and second differential interface stages 41*b* and 51*b*, which are identical to stages 21*a* and 31*a* described above, i.e. they are operational amplifiers for differential signal processing, in a buffer configuration. Such stages 41*b* and 51*b* are connected at their outputs to respective differential interconnections 171 and 172, which may be separate cables.

A differential digital driver 47 with low output voltage swing, such as an LVDS buffer, is employed to drive the digital embedded communication channel. Capacitors C7 and C8 are used to couple the two differential outputs of the buffer 47 to the common mode nodes 48 and 58 of the analog buffers 41*b* and 51*b*. The value of the de-coupling capacitor depends on the maximum frequency required for the digital embedded communication channel.

The receiving side of the vertical modem 11*a* comprises two further differential interface stages 41*a* and 51*a*, whose differential inputs are connected to the differential interconnections 171 and 172, respectively. These two stages are employed to buffer the I- and Q-demodulated base-hand signals.

The two orthogonal signals are then processed by the XPIC cancellers 52 and 53 for XPIC cancellation purposes according to the prior art.

The identical serial resistors R5-R6 and R7-R8 supply a properly termination of the two differential lines. The common mode voltage applied to the transmitter side 11*b* is also received at the middle points C and D of two serial resistor networks R5-R6 and R7-R8. The voltage changes, coupled via capacitors C5 and C6, are dropped probing the point C and D by a differential low swing voltage buffer 57, used to receive the differential value between the two common mode voltages from the I- and Q-branches. Thus, the difference between the inputs of buffer 57, which is output from the buffer 57, is exactly the same recovered digital data stream supplied on the transmitter side in the horizontal modem 11*b*, at the input of 47.

Figure 5:
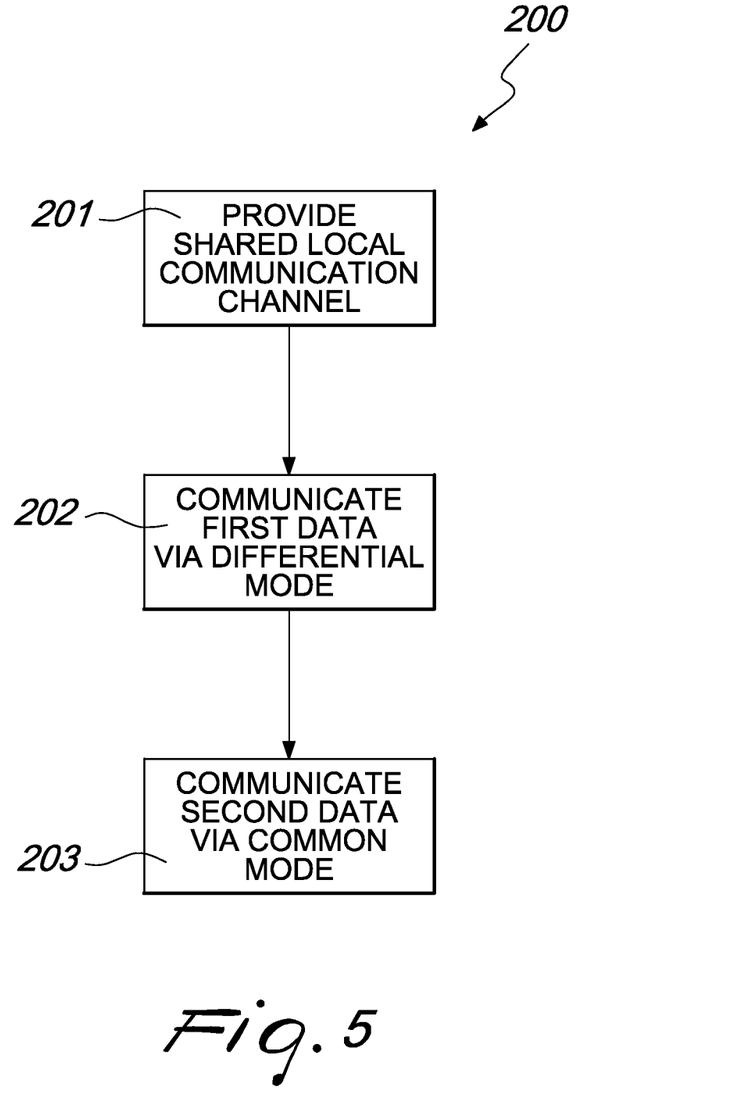
FIG. 5 is a flow diagram showing a method according to the present invention.

It is seen that the method 200 of communicating data within a radio link 11 employing communication of CCDP RF signals essentially comprises three steps, which are shown in FIG. 5.

At step 201, at the radio link the local communication channel 11*c* shared between the horizontal polarization communication device 11*b* and the vertical polarization communication device 11*a* is provided.

At step 202 the horizontal polarization communication device 11*b* and the vertical polarization communication device 11*a* of the radio link communicate the first data over the local communication channel via a differential mode, as discussed above.

At step 203 the horizontal polarization communication device 11*b* and the vertical polarization communication device 11*a* of the radio link communicate the second data over the local communication channel via common mode.

It is noted that a new and unique channel embedded technique is used to transmit and receive digital data by handling the common mode voltage $V_{CM}$ of the two main I&Q branches shared between the two XPIC modems. The digital data channel, used to connect the two XPIC modems, is based on a low voltage swing standard (LVDS is an appropriate one). The common mode voltages ($V_{CM}$) of the two differential I- and Q-analog signals are used as a medium to transport particular data information, which has been called second data. The $V_{CM}$ of the two I- and Q-QAM branches are coupled, via capacitors, to the positive and negative of a differential digital data transmitter such as buffers 27 and 47. The use of a low swing voltage standard, added to the $V_{CM}$, does not disturb the I- and Q-signals exchanged between the two modems. In other words, the transmitter of the digital embedded communication channel, designed to work in differential mode, weakly drives the common mode voltages around their nominal value without interfering and disturbing the main I- and Q-branches shared by the modems. This is because analog I- and Q-ways are differential signals and, within an acceptable wide range, are immune to the variation of the common mode.

This solution just takes the advantage of the intrinsic common mode rejection ratio of differential drivers, simplifying the hardware external circuitry.

At receiver side the digital data channel embedded in the communication channel 11*c* is dropped using a differential receiver buffer. The $V_{CM}$ driven by the transmitter side can be recovered easily in the receiver side. The matching resistors placed at the end of the transmitting line, a hundred ohms usually present when a differential signal is used, could be employed to drop the extra digital data channel. If the termination resistance consists of equal resistors in serial configuration, the middle point of them supplies just the $V_{CM}$ of the differential link. Coupling the common mode to a differential receiver such as an LVDS standard receiver can result in a medium frequency (about up to 1 Mbps) digital data communication link.

LVDS signaling is transported in channel 11c, as the I- and Q-analog signals, in a differential way. This guarantees a high immunity of the transport data versus external electromagnetic disturbances.

Figure 6:
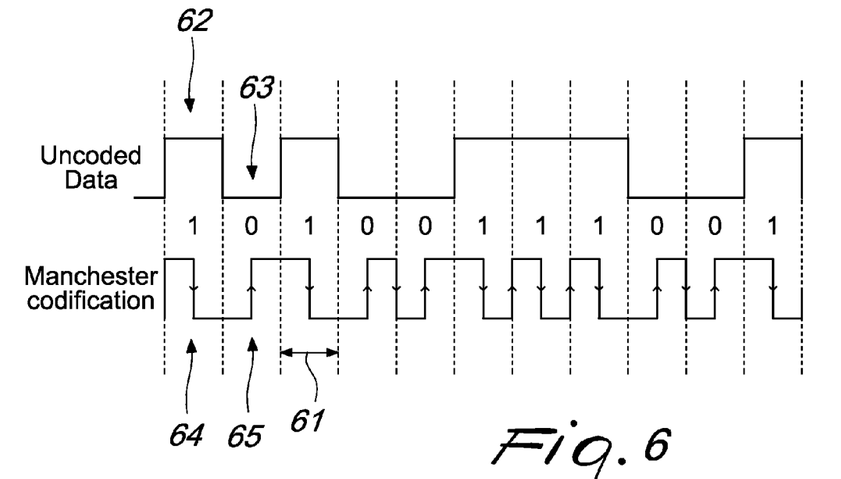
FIG. 6 shows a Manchester codification of digital data to be transmitted over the embedded communication channel according to an embodiment of the invention.

FIG. 6 shows in detail the Manchester codification, one of the possible encoding algorithms of the second data at the transmitting side of each modem.

The Manchester code works codifying a logic state 'zero' with a transition low-to-high, whereas the logic state 'one' is obtained as a transition high-to-low. Each bit is transmitted with a fixed time period 61 given by a multiple of the TX clock period. FIG. 6 reports how this algorithm transforms the input bits in a coded stream.

Every coded bit contains a transition at the midpoint of a time period 61. An uncoded data hit 'one' 62 is Manchester encoded as a hit 64 which is initially 'one' and then shows a high-to-low transition to a 'zero' state.

An uncoded data hit 'zero' 63 is Manchester encoded as a hit 65 which is initially 'zero and then shows a low-to-high transition to a 'one' state.

By means of the data transmission technique the coded stream is received by the receiver side as a common mode voltage and provided to the input of the decoder block.

If needed, clock recovery function could be implemented. For instance, considering the availability of the RX clock 36, according to FIG. 3, if such clock is chosen so that it has a higher frequency than the bit data rate of the digital channel, it becomes natural to use an oversampling technique for clock recovery process. The high frequency of the RX clock 36 allows to oversampling the encoded data, distinguishing the transition which define the content of the data receiver (transition low-to-high means a zero whereas transition high-to-low identifies a one). Thus, the decoded data is synchronous with the RX clock 36 or at a multiple of its frequency.

An alternative clock/data recovery could be based on the availability of a platform system clock. This solution may be applied if a common synchronous clock at platform level is available. In other words, in all boards which are working in the platform, then also the two XPIC modems, a common system clock is present. This synchronous clock is employed both in TX encoding block 25 and RX decoding block 35, thus obtaining an RX/TX structure already self-synchronized.

Figure 7:
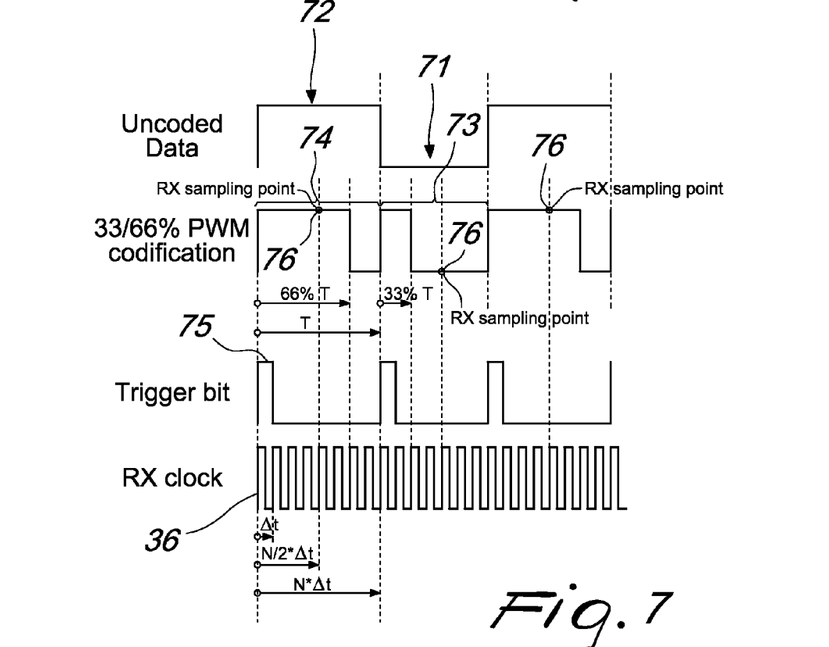
FIG. 7 shows a 33/66% Pulse Width Modulation codification of digital data to be transmitted over the embedded communication channel according to another embodiment of the invention.

FIG. 7 shows in detail another possible encoding algorithm of digital data on the transmitting side of each modem, that is 33/66% Pulse Width Modulation code.

Also in this case the bit is transmitted with a fixed period proportionally to the TX clock. The code transforms a logic state 'zero' 71 to a pulse 73 with the 33% of its period high and the rest of the time low (66%). Vice versa, the state logic 'one' 72 is generated as a pulse 74 with the 66% of its period high and the remaining low (33% of the time period). Like Manchester code, 33/66% Pulse Width Modulation (PWM) code supplies at least one transition high-to-low or low-to-high for each transmitted bit. This feature renders the implementation of the clock recovery block easy in the RX side (be it the vertical modem or the horizontal modern). In fact, using an overclocking technique by means of the RX clock 36, if defined as a multiple N of the rate of the embedded digital channel, the start of the bit detecting a transition low-to-high (trigger hit 75) can be identified. Then, the value of the decoded bit is just the value of the receiver encoded data, sampled N/2 periods Δt of the RX clock 36 after the start of the trigger bit 75, at an RX sampling point 76. This procedure, namely identifying the trigger bit signal 75 and sampling the coded stream after N/2 periods of the RX clock 36, shall be performed for each received encoded bit. After the clock recovery operation, the information embedded in the communication channel 11c is available as coupled with a synchronous clock (RX clock 36 or a multiple thereof), ready to be processed by downstream blocks.

Also in this case, the RX synchronization can be alternatively obtained using, if available, a common platform clock.

As it can be noted from the above description of the invention, the physical transport layer devices proposed in this disclosure are extremely flexible, thus can work also with other data/clock encoding different from the implementations described in this document. However, the solution using a Manchester or a 33/66% PWM code results to be the best ones due to the intrinsic features in terms of implementation simplicity and low cost.

The implementation of the embedded communication channel carrying the second data according to the preferred embodiment of the invention provides a proper protocol layer for formatting the information to be exchanged between the two modems. The solution is based on a synchronous frame protocol, wherein data to be sent is encapsulated into structured frames which are transmitted one after the other. The frame structure is reported in detail in FIG. 8. Each frame 81 has a specific length which is chosen so as to be a good trade off between quantity of data to be transported and the rate at which this data needs to be refreshed at each frame, essentially in order to perform real time operations with the information exchanged between the two modems.

Figure 8:
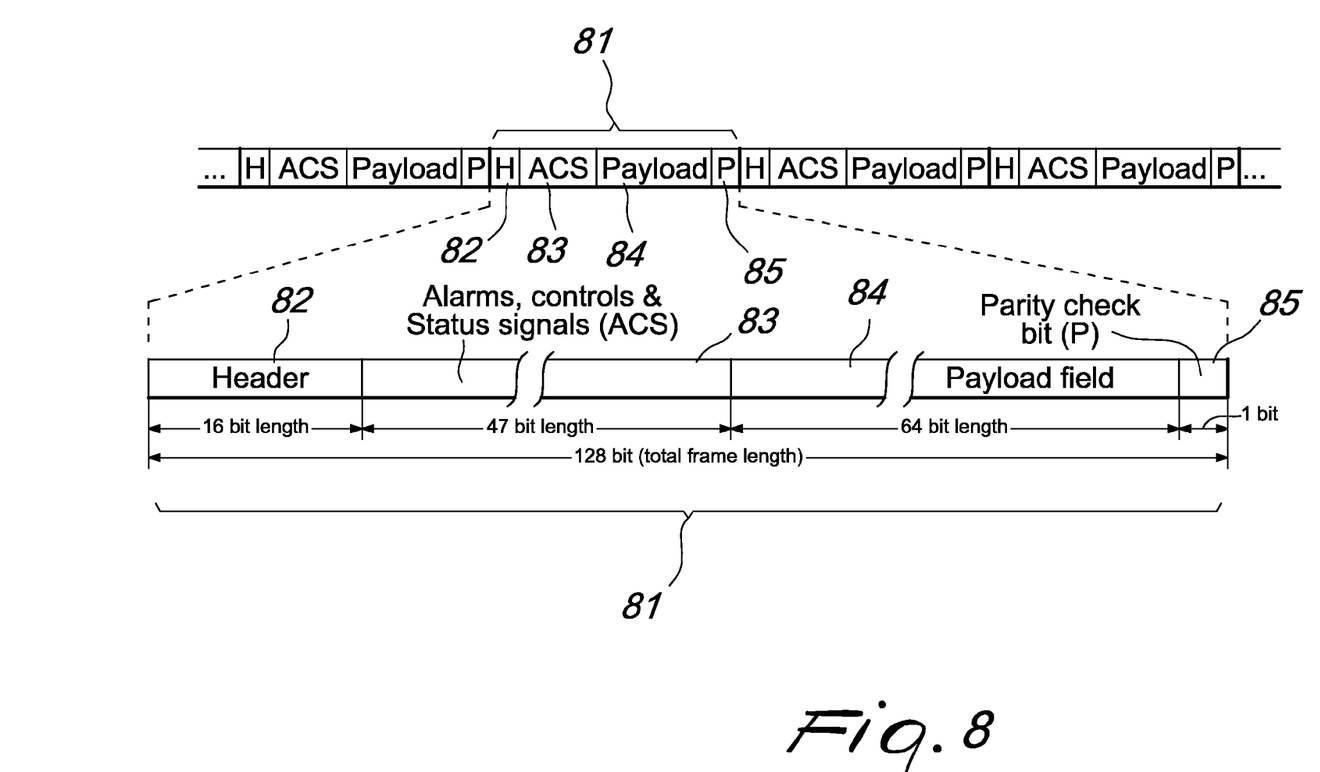
FIG. 8 shows the frame structure for the embedded digital data channel according to an embodiment of the invention.

Each frame 81 is formed by different groups of bits sequentially arranged: the first group is a header 82, which may be 16-bit long and is needed at the receiver side of the modem to identify the start of the frame. The second group of bits is an Alarms, Controls and Status signals (ACS) frame 83, in which the second data according to the invention, i.e. the information to be exchanged between the two XPIC modems, is encapsulated: the ACS frame 83 may be 47-bit long.

The information carried by the ACS frame 83 may be important data for the reliability of the radio link, such as QAM modulation order, quality of the radio channel, traffic rate, fault and alarm detections or any other information requiring a quick reaction by the cross polar XPIC modem, in order to avoid or, at least, to limit the inoperative time of the radio link.

The processing devices in the receiver side, not shown in the figures, can accordingly perform all real time operations based on the value of the bits transported in the ACS frame 83.

Frame 81 may also include a Payload field 84, e.g. 64 bits arranged in 4 registers of 16 bits, to be employed for general purpose communication. Typically this Payload field 84 can be used by the local microprocessor to send and receive information from and to the cross polar XPIC modem.

The latest field 85 of frame 81 is used to transport a parity bit. The value of this bit is automatically inserted during the construction of the frame in the transmitter side of each modem, and is the result of an even bit check of the data included in the frame. In other words, the value of the bit in field 85 is set to one if the number of ones in the frame is odd otherwise is set to zero. In the receiver side of the modem, an even parity check is performed to detect if some bit errors occurred in the transmission. If the parity bit 85 does not match with the expected one the whole data in the frame 81 are rejected. As it is clear from the description above, the total length of the frame is 128 bits.

In order to improve the robustness of the channel, in the receiver side of each modem an aligner sequence may also be implemented. The algorithm is sketched in FIG. 9. The validation of the frame 81 occurs just after the detection of three consecutive header words. The algorithm 300 starts at step 301; then, at step 302 it is checked whether the first header bit sequence is detected. If so, the state machine steps in a first pre-synchronization state 303 and a counter starts a calculation from 0 to 128 (the length of the frame). At the end of the count, at step 304, a new checking of a header word is performed, and if the result is positive the algorithm provides to pass, at step 305, to the follow second pre-synchronization state, which resets and starts the counter again.

Figure 9:
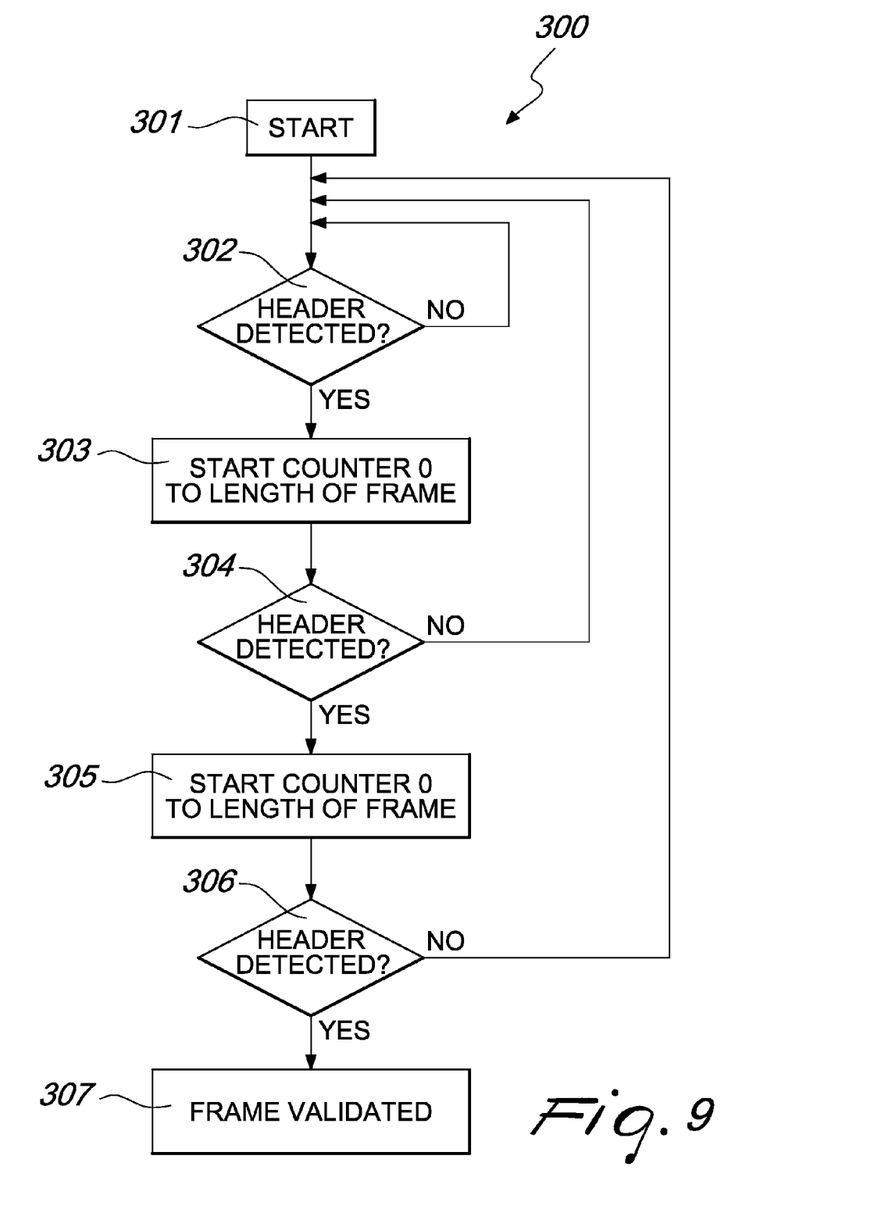
FIG. 9 is a flow diagram depicting an alignment sequence for the embedded digital data channel according to an embodiment of the invention.

If, at the end of this second count (128 steps), a new header word checking at step 306 gives another positive outcome, the frame is definitely validated at step 307 and the channel can be considered operative. Even when the alignment or validated state is reached, the counter starts its calculation every 128 steps (synchronous with the header), and at the end of each calculation a header bit word shall be detected in order to maintain the alignment status.

Both in the pre-synchronization states and in the alignment state described above, if the header bit sequence is not detected in the right position (every 128 bits), the state machine is placed under reset and the process returns at the initial state 301.

It has been noted that the invention achieves the intended aim and objects. Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A first communication device connectable to a corresponding second communication device through a local communication channel for carrying out cross-polar interference cancellation of a received radio signal, said first communication device comprising:
 a first QAM demodulator and a second QAM demodulator for demodulating a first one of two orthogonal components of the radio signal;
 a first analog differential interface stage and a second analog differential interface stage connected downstream of a respective one of said first and second QAM demodulators, for transmitting respective QAM demodulated components of said first component of the radio signal as differential analog signals over said local communication channel, and
 a digital data stream source for generating a digital data stream containing information to be shared with said second communication device and which information is fed to said first and second analog differential interface stages as a common mode signal for communicating said information in a digital channel embedded into the local communication channel.

2. The first communication device of claim 1, further comprising a third and a fourth differential interface stage, for receiving reciprocally orthogonal QAM-demodulated components of the second one of the two reciprocally orthogonal components of said cross-polarized radio signal from said local communication channel.

3. The first communication device of claim 2, further comprising at least one Cross-Polarization Interference Canceller (XPIC) which is connected to an output of said third and fourth differential interface stages.

4. The first communication device of claim 1, wherein
 the first communication device further comprises a data encoder configured to i) encode the digital data stream output from the digital data stream source, thereby generating encoded data, and ii) output the encoded data,
 the first analog differential interface stage is configured to receive the encoded data, and
 the second analog differential interface stage is configured to receive the encoded data.

5. The first communication device of claim 4, wherein
 the first analog differential interface stage is configured to further receive a first demodulated component from the first QAM demodulator, and
 the second analog differential interface stage is configured to further receive a second demodulated component from the second QAM demodulator.

6. The first communication device of claim 5, wherein
 the first analog differential interface stage is configured to transmit the first demodulated component to the second communication device over the local communication channel, and
 the second analog differential interface stage is configured to transmit the second demodulated component to the second communication device over the local communication channel.

7. The first communication device of claim 1, wherein said digital data stream is encoded through a Manchester code or a 33/66% Pulse Width Modulation code.

8. The first communication device of claim 1, wherein said information is any one of modulation order, traffic rate, quality of the radio channel, fault detection, and alarm detection.

9. The first communication device of claim 1, wherein said communication device is a modem suitable for adaptive modulation and cross-polarization cancellation (XPIC) radio links.

10. The first communication device of claim 1, wherein
 the first analog differential interface stage is configured to receive a first demodulated component from the first QAM demodulator, and
 the second analog differential interface stage is configured to receive a second demodulated component from the second QAM demodulator.

11. A receiver stage of a radio link for receiving radio signals with orthogonal polarization, comprising:
 a vertical polarization communication device for demodulating a vertical component of a cross-polarized radio signal; and
 a horizontal polarization communication device for demodulating a horizontal component of said cross-polarized radio signal, said vertical and horizontal polarization communication devices sharing a local communication channel for providing XPIC cancellation, wherein
 the vertical polarization communication device comprises:
  a first QAM demodulator and a second QAM demodulator for demodulating the vertical component of the cross-polarized radio signal;
  a first analog differential interface stage, coupled to an output of said first QAM demodulator, for receiving from the first QAM demodulator a first QAM demodulated component of said cross-polarized radio signal and for transmitting the first QAM demodulated component over said local communication channel towards the horizontal polarization communication device;

a second analog differential interface stage, coupled to an output of said second QAM demodulator, for receiving from the second QAM demodulator a second QAM demodulated component of said cross-polarized radio signal and for transmitting the second QAM demodulated component over said local communication channel towards the horizontal polarization communication device;

a first digital data stream source for generating a digital data stream containing information to be shared with the horizontal polarization communication device and which digital data stream is fed to said first and second analog differential interface stages as a common mode signal for communicating said information in a digital channel embedded into the local communication channel to the horizontal polarization communication device; and the horizontal polarization communication device comprises:

a third QAM demodulator and a fourth QAM demodulator for demodulating the horizontal component of the cross-polarized radio signal;

a third analog differential interface stage, coupled to an output of said third QAM demodulator, for receiving from the third QAM demodulator a third QAM demodulated component of said cross-polarized radio signal and for transmitting the third QAM demodulated component over said local communication channel towards the vertical polarization communication device;

a fourth analog differential interface stage, coupled to an output of said fourth QAM demodulator, for receiving from the fourth QAM demodulator a fourth QAM demodulated component of said cross-polarized radio signal and for transmitting the fourth QAM demodulated component over said local communication channel towards the vertical polarization communication device;

a second digital data stream source for generating a digital data stream containing information to be shared with the vertical polarization communication device and which digital data stream is fed to said third and fourth analog differential interface stages as a common mode signal for communicating said information in a digital channel embedded into the local communication channel to the vertical polarization communication device.

12. The receiver stage of claim 11, wherein
said vertical polarization communication device further comprises a fifth differential interface stage and a sixth differential interface stage, for receiving, respectively, said third and fourth QAM-demodulated components from said local communication channel, and
said horizontal polarization communication device further comprises a seventh differential interface stage and an eighth differential interface stage, for receiving, respectively, said first and second QAM-demodulated components from said local communication channel.

13. The receiver stage of claim 12, wherein each of said vertical and horizontal polarization communication devices further comprises at least one Cross-Polarization Interference Canceller (XPIC) which is connected to an output of said third and fourth differential interface stages.

14. The receiver stage of claim 11, wherein each of said vertical and horizontal polarization communication devices further comprises a clock data encoder connected downstream of said data stream source for encoding said digital data stream before transmission and a clock generator, said clock data encoder being connected to said first and second analog differential interface stages through a buffer.

15. The receiver stage of claim 11, wherein said digital data stream is encoded through a Manchester code or a 33/66% Pulse Width Modulation code.

16. The receiver stage of claim 11, wherein said information is any one of modulation order, traffic rate, quality of the radio channel, or fault and alarm detections.

17. The receiver stage of claim 11, wherein each of said vertical and horizontal polarization communication devices is a modem suitable for adaptive modulation and cross-polarization cancellation (XPIC) radio links.

18. A radio communication network comprising a plurality of radio links for communicating radio signals with orthogonal polarization, each radio link comprising the receiver stage of claim 11.

19. A method for communication of radio signals in a radio communication network between a plurality of radio links, wherein each radio link includes a receiver stage comprising a vertical polarization communication device for demodulating a vertical component of a cross-polarized radio signal and a horizontal polarization communication device for demodulating a horizontal component of said cross-polarized radio signal, said vertical and horizontal polarization communication devices sharing a local communication channel for providing XPIC cancellation, each of said vertical and horizontal polarization communication devices comprising a first QAM demodulator and a second QAM demodulator for demodulating a respective one of the two orthogonal components of the cross-polarized radio signal, wherein the vertical component is for the vertical polarization communication device and the horizontal component is for the horizontal polarization communication device, each of said vertical and horizontal polarization communication devices further comprising a first analog differential interface stage and a second analog differential interface stage connected downstream of a respective one of said first and second QAM demodulators, for transmitting respective QAM demodulated components of said respective component of the two orthogonal components of the cross-polarized radio signal as differential analog signals over said local communication channel towards the other one of said vertical and horizontal polarization communication devices, wherein each of said vertical and horizontal communication devices comprises a digital data stream source for generating a digital data stream containing information to be shared with the other of the vertical and horizontal polarization communication device and which is fed to said first and second analog differential interface stages as a common mode signal for communicating said information in a digital channel embedded into the local communication channel to the other one of said vertical and horizontal polarization communication device, the method comprising the steps of:

at each radio link, providing said local communication channel shared between said vertical polarization communication device and said horizontal polarization communication device;

transmitting the respective QAM demodulated components of the vertical component of the cross-polarized radio signal as differential analog signals over said local communication channel from the vertical polarization communication device towards the horizontal polarization communication device through its first and second analog differential interface stage;

transmitting the respective QAM demodulated components of the horizontal component of the cross-polarized radio signal as differential analog signals over said local communication channel from the horizontal polarization communication device towards the vertical polarization communication device through its first and second analog differential interface stage;

generating said digital data stream containing information to be shared with the other one of said vertical and horizontal polarization communication device and feeding said digital data stream to said first and second analog differential interface stages as a common mode signal for communicating said information in a digital channel embedded into the local communication channel to the other one of said vertical and horizontal polarization communication device.

20. The method of claim 19, wherein:

said respective QAM demodulated components of the vertical component of the cross-polarized radio signal are transmitted to a Cross Polarization Interface Canceller of said horizontal polarization communication device so as to obtain a cross-talk compensation signal;

said respective QAM demodulated components of the horizontal component of the cross-polarized radio signal are transmitted to a Cross Polarization Interface Canceller of said vertical polarization communication device so as to obtain another cross-talk compensation signal.

21. The method of claim 20, further including the steps of:

at the vertical polarization communication device, subtracting from the respective QAM demodulated components of the vertical component of the cross-polarized radio signal the cross-talk compensation signal from said horizontal communication device; and at the horizontal polarization communication device, subtracting from the respective QAM demodulated components of the horizontal component of the cross-polarized radio signal the cross-talk compensation signal from said vertical communication device.

22. The method of claim 19, wherein said feeding the digital data stream comprises, at each one of said vertical and horizontal polarization communication devices:

encoding said digital data stream;

sending the encoded digital data stream to a common mode node of said differential interface stage, so as to be transmitted as said common mode signal over said local communication channel.

23. The method of claim 22, further comprising, at each one of said vertical and horizontal polarization communication devices:

receiving said common mode signal from said local communication channel;

decoding said common mode signal into the digital data stream.

24. The method of claim 23, wherein said encoding includes encoding according to a Manchester code or to a 33/66% Pulse Width Modulation code.

\* \* \* \* \*

UNITED STATES PATENT AND TRADEMARK OFFICE
CERTIFICATE OF CORRECTION

| | | |
|---|---|---|
| PATENT NO. | : 8,615,055 B2 | |
| APPLICATION NO. | : 13/260606 | |
| DATED | : December 24, 2013 | |
| INVENTOR(S) | : Milotta et al. | |

It is certified that error appears in the above-identified patent and that said Letters Patent is hereby corrected as shown below:

In the Specification

In Column 5, Line 41, delete "moderns," and insert -- modems, --, therefor.

In Column 5, Line 63, delete "moderns." and insert -- modems. --, therefor.

In Column 6, Line 18, delete "moderns" and insert -- modems --, therefor.

In Column 7, Line 16, delete "antenna 15" and insert -- antenna 14 --, therefor.

In Column 7, Line 19, delete "antenna 14." and insert -- antenna 15. --, therefor.

In Column 7, Line 22, delete "modern 11b." and insert -- modem 11b. --, therefor.

In Column 7, Line 23, delete "modern 11a" and insert -- modem 11a --, therefor.

In Column 8, Line 67, delete "modern 11b" and insert -- modem 11b --, therefor.

In Column 9, Line 66, delete "base-hand" and insert -- base-band --, therefor.

In Column 11, Line 19, delete "data hit" and insert -- data bit --, therefor.

In Column 11, Line 20, delete "hit 64" and insert -- bit 64 --, therefor.

In Column 11, Line 22, delete "data hit" and insert -- data bit --, therefor.

In Column 11, Line 23, delete "hit 65" and insert -- bit 65 --, therefor.

In Column 11, Line 61, delete "modern)." and insert -- modem). --, therefor.

In Column 11, Line 65, delete "hit" and insert -- bit --, therefor.

In Column 12, Lines 58-59, delete "modern," and insert -- modem, --, therefor.

Signed and Sealed this
Fifth Day of August, 2014

Michelle K. Lee
*Deputy Director of the United States Patent and Trademark Office*